United States Patent
Wang et al.

(10) Patent No.: US 10,356,141 B2
(45) Date of Patent: Jul. 16, 2019

(54) METHOD AND DEVICE FOR EXCHANGING ENDPOINT INFORMATION, AND TELEPRESENCE ENDPOINT

(71) Applicant: ZTE Corporation, Shenzhen (CN)

(72) Inventors: Liang Wang, Shenzhen (CN); Xiaoyang Ye, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 277 days.

(21) Appl. No.: 15/025,686

(22) PCT Filed: Apr. 21, 2014

(86) PCT No.: PCT/CN2014/075844
§ 371 (c)(1),
(2) Date: Mar. 29, 2016

(87) PCT Pub. No.: WO2015/043170
PCT Pub. Date: Apr. 2, 2015

(65) Prior Publication Data
US 2016/0234270 A1     Aug. 11, 2016

(30) Foreign Application Priority Data

Sep. 29, 2013   (CN) .......................... 2013 1 0455367

(51) Int. Cl.
*H04L 29/06*     (2006.01)
*H04N 7/15*      (2006.01)

(52) U.S. Cl.
CPC ...... *H04L 65/4069* (2013.01); *H04L 65/1006* (2013.01); *H04L 65/1009* (2013.01);
(Continued)

(58) Field of Classification Search
None
See application file for complete search history.

(56) References Cited

U.S. PATENT DOCUMENTS

| | | | |
|---|---|---|---|
| 5,812,534 A | 9/1998 | Davis et al. | |
| 5,815,234 A * | 9/1998 | Dileo | G02C 7/14 |
| | | | 351/59 |

(Continued)

FOREIGN PATENT DOCUMENTS

| | | |
|---|---|---|
| CN | 1290107 A | 4/2001 |
| CN | 101015189 A | 8/2007 |

(Continued)

OTHER PUBLICATIONS

International Search Report for corresponding application PCT/CN2014/075844 filed on Apr. 21, 2014; dated Aug. 4, 2014.

(Continued)

*Primary Examiner* — Natisha D Cox
(74) *Attorney, Agent, or Firm* — Cantor Colburn LLP

(57) ABSTRACT

Provide are a method and device for exchanging endpoint information and a telepresence endpoint. The method includes that: multiplexing information is exchanged between telepresence endpoints. By means of the present disclosure, the problem in the related art that there are too many ports and multiplexing transmission is unsmooth due to the fact that a multiplexing transmission mode of a traditional session system is still adopted in a telepresence system based on a conventional protocol architecture is solved, and the effect of exchanging the multiplexing information between the telepresence endpoints and therefore multiplexing can be successfully performed in the telepresence system is further achieved.

17 Claims, 14 Drawing Sheets

(52) U.S. Cl.
CPC ...... *H04L 65/1069* (2013.01); *H04L 65/1083* (2013.01); *H04L 65/403* (2013.01); *H04L 65/608* (2013.01); *H04L 69/24* (2013.01); *H04N 7/15* (2013.01)

(56) References Cited

U.S. PATENT DOCUMENTS

| | | | |
|---|---|---|---|
| 2004/0174817 A1* | 9/2004 | Jabri | H04L 29/06027 370/238 |
| 2006/0034332 A1* | 2/2006 | Haga | H04J 3/1688 370/474 |
| 2007/0058794 A1* | 3/2007 | Abrol | H04L 29/06027 379/202.01 |
| 2007/0297352 A1* | 12/2007 | Jabri | H04L 29/06027 370/261 |
| 2008/0266377 A1* | 10/2008 | Kim | H04N 7/147 348/14.02 |
| 2014/0139618 A1* | 5/2014 | Ye | H04N 7/147 348/14.09 |
| 2014/0333712 A1* | 11/2014 | Kim | H04N 7/147 348/14.02 |
| 2016/0277246 A1* | 9/2016 | Wei | H04L 41/0813 |

FOREIGN PATENT DOCUMENTS

| | | |
|---|---|---|
| CN | 101374330 A | 2/2009 |
| EP | 2114049 A1 * | 11/2009 |
| EP | 2114049 A1 | 11/2009 |
| JP | 2005057362 A | 3/2005 |
| WO | 2006066454 A1 | 6/2006 |

OTHER PUBLICATIONS

EP Search Report, dated Sep. 5, 2016, EP Application No. 14847689.8, 8 pages.

Ivov Jitsi E Marocco Telecom Italia P Thatcher Google E: "No Plan: Economical Use of the Offer/Answer Model in WebRTC Sessions with Multiple Media Sources; draft-ivov-rtcweb-noplan-01.txt", draft-Ivov-Rtcweb-noplan-01.txt, Internet Engineering Task Force, IETF; Standardworkingdraft, Internet Society (ISOC) 4, Rue Des Falaises Ch-1205 Genev, Jun. 17, 2013, pp. 1-20, XP015090531, [retrieved on Jun. 17, 2013].

* cited by examiner

METHOD AND DEVICE FOR EXCHANGING ENDPOINT INFORMATION, AND TELEPRESENCE ENDPOINT

TECHNICAL FIELD

The present disclosure relates to the field of communications, and in particular to a method and device for exchanging endpoint information, and a telepresence endpoint.

BACKGROUND

A video session system adopts a conventional protocol stack, the transmission of a path of main video stream between terminals is supported, a transmission requirement for multiple paths of main video streams is not supported, and the requirement of capture features of each stream is not described. For example, a spatial area at which a camera captures video streams is not described. When designing a telepresence system, the video session system is improved, the transmission of multiple paths of media streams is supported, and the capture features of each stream are described. The problem how to transmit the multiple paths of media streams by means of a telepresence session system also exists currently. If a traditional transmission mode of transmitting one path of media stream via one port is still adopted, there will be a obstacle when performing Network Address Translation (NAT) or crossing firewall due to the adoption of too many ports. The best way refers to that multiplexing transmission is performed on the multiple paths of media streams on the same transmission address, and the compatibility of new devices and old devices is supported on the basis of supporting multiplexing transmission. However, there is no corresponding solution how to transmit the multiple paths of media streams by the telepresence system in the related art.

Thus, the problem that there are too many ports and multiplexing transmission is unsmooth due to the fact that a multiplexing transmission mode of a traditional session system is still adopted in the telepresence system based on a conventional protocol architecture exists in the related art.

SUMMARY

A method and device for exchanging endpoint information are provided in the embodiment of the present disclosure, which are intended to at least solve the problem in the related art that there are too many ports and multiplexing transmission is unsmooth due to the fact that the multiplexing transmission mode of the traditional session system is still adopted in the telepresence system based on the conventional protocol architecture.

According to one aspect of the embodiment of the present disclosure, a method for exchanging endpoint information is provided, comprising: telepresence endpoints exchanging multiplexing information.

In an example embodiment, the multiplexing information comprises at least one of: multiplexing indication information used for indicating whether a telepresence endpoint adopts multiplexing; multiplexing type information used for indicating a multiplexing type by which multiplexing mapping information is exchanged; and the multiplexing mapping information used for describing a mapping relationship between a media capture code stream and a transmission code stream.

In an example embodiment, the telepresence endpoints exchange the multiplexing indication information in at least one of following manners: the telepresence endpoints exchanging the multiplexing indication information when the telepresence endpoints are exchanging a terminal capability set; and the telepresence endpoints exchanging the multiplexing indication information when the telepresence endpoints are setting up a call.

In an example embodiment, the telepresence endpoints exchange the multiplexing type information in at least one of following manners: the telepresence endpoints exchanging the multiplexing type information when the telepresence endpoints are exchanging a terminal capability set; and the telepresence endpoints exchanging the multiplexing type information when the telepresence endpoints are setting a call.

In an example embodiment, the telepresence endpoints exchange the multiplexing mapping information in at least one of following manners: in a signalling exchange process, the telepresence endpoints exchanging the multiplexing mapping information by carrying the multiplexing mapping information in signalling information; and when transmitting a media stream, the telepresence endpoints exchanging the multiplexing mapping information by carrying the multiplexing mapping information at an extended header of the transmitting media stream.

In an example embodiment, after the telepresence endpoints exchanging the multiplexing information, the method further comprising: performing multiplexing transmission on a media stream according to a result of exchanging the multiplexing information.

According to another aspect of the embodiment of the present disclosure, a device for exchanging endpoint information is provided, applicable to telepresence endpoints, comprising: an exchanging component, configured to exchange multiplexing information.

In an example embodiment, the exchanging component comprises at least one of: a first exchanging element, configured to exchange multiplexing indication information comprised in the multiplexing information when exchanging a terminal capability set; and a second exchanging element, configured to exchange multiplexing indication information comprised in the multiplexing information when setting up a call.

In an example embodiment, the exchanging component comprises at least one of: a third exchanging element, configured to exchange multiplexing type information comprised in the multiplexing information when exchanging a terminal capability set; and a fourth exchanging element, configured to exchange multiplexing type information comprised in the multiplexing information when setting up a call.

In an example embodiment, the exchanging component comprises at least one of: a fifth exchanging element, configured to, in a signalling exchange process, exchange multiplexing mapping information by carrying the multiplexing mapping information in signalling information; and a sixth exchanging element, configured to, when transmitting a media stream, exchange the multiplexing mapping information by carrying the multiplexing mapping information at an extended header of the transmitting media stream.

In an example embodiment, further comprising: a transmitting component, configured to perform multiplexing transmission on a media stream according to a result of exchanging the multiplexing information.

According to still another aspect of the embodiment of the present disclosure, a telepresence endpoint is provided, comprising any one of the above devices.

By means of the present disclosure, telepresence endpoints exchange the multiplexing information, so that the problem in the related art that there are too many ports and multiplexing transmission is unsmooth due to the fact that the multiplexing transmission mode of the traditional session system is still adopted in the telepresence system based on the conventional protocol architecture is solved, and the effect of exchanging the multiplexing information between the telepresence endpoints and therefore multiplexing can be successfully performed in the telepresence system is further achieved.

BRIEF DESCRIPTION OF THE DRAWINGS

The drawings described herein are intended to provide further understanding of the present disclosure, and form a part of the present disclosure. The schematic embodiments and descriptions of the present disclosure are intended to explain the present disclosure, and do not form improper limits to the present disclosure. In the drawings.

DETAILED DESCRIPTION OF THE EMBODIMENTS

The present disclosure is described below with reference to the drawings and the embodiments in detail. It is important to note that the embodiments of the present disclosure and the characteristics in the embodiments can be combined when there is no conflict.

The present disclosure is described below with reference to the drawings and the embodiments in detail. It is important to note that the embodiments of the present disclosure and the characteristics in the embodiments can be combined when there is no conflict.

Figure 1:
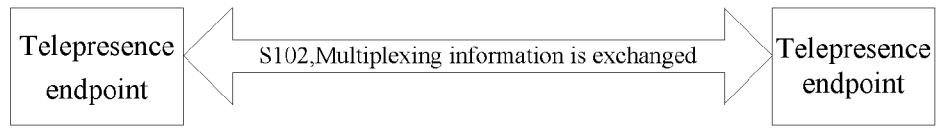
FIG. 1 is a flowchart of a method for exchanging endpoint information according to an embodiment of the present disclosure.

In the embodiment, a method for exchanging endpoint information is provided. FIG. 1 is a flowchart of a method for exchanging endpoint information according to an embodiment of the present disclosure. As shown in FIG. 1, the flow includes the steps as follows.

Step S102: telepresence endpoints exchange multiplexing information.

By means of the step, the telepresence endpoints exchange the multiplexing information, compared with in the related art the adoption of a traditional media stream transmission mode instead of the exchange of the multiplexing information, which meets requirements of a telepresence system for a multiplexing transmission mode, and enables the telepresence endpoints be able to obtain the multiplexing information of opposite ends in time; and multiplexing media stream transmission is performed according to the exchanged multiplexing information, the smoothness of multiplexing is improved.

It is important to note that the multiplexing information may comprise at least one of: multiplexing indication information used for indicating whether a telepresence endpoint adopts multiplexing; multiplexing type information used for indicating a multiplexing type by which multipath mapping information is exchanged; and the multiplexing mapping information used for describing a mapping relationship between a media capture code stream and a transmission code stream.

The telepresence endpoints can exchange the multiplexing indication information in the multiplexing information in multiple processing manner. For example, the telepresence endpoints exchange the multiplexing indication information in at least one of the manner as follows. For example, the telepresence endpoints exchange the multiplexing indication information when the telepresence endpoints are exchanging a terminal capability set. For another example, the telepresence endpoints exchange the multiplexing indication information when the telepresence endpoints are setting up a call.

The telepresence endpoints can exchange the multiplexing type information in the multiplexing information in multiple processing manner. For example, the telepresence endpoints can exchange the multiplexing type information in at least one of the manner as follows. For example, the telepresence endpoints exchange the multiplexing type information when the telepresence endpoints are exchanging a terminal capability set. For another example, the telepresence endpoints exchange the multiplexing mode information when the telepresence endpoints are setting up a call.

The telepresence endpoints may exchange the multiplexing mapping information in the multiplexing information in multiple processing manners. For example, the telepresence endpoints can exchange the multiplexing mapping information in at least one of the modes as follows. For example, in a signalling exchange process, the telepresence endpoints exchange the multiplexing mapping information by carrying the multiplexing mapping information in signalling information; and when transmitting a media stream, the telepresence endpoints exchange the multiplexing mapping information by carrying the multiplexing mapping information at an extended header of the transmitting media stream.

In an exemplary embodiment, after the telepresence endpoints exchange the multiplexing information, the flow can further comprise that: multiplexing transmission is performed on a media stream according to a result of exchanging the multiplexing information.

In the embodiment, a device for exchanging endpoint information is further provided. The device is configured to realize the embodiments and the examplary implementation modes which have been explained without detailed descriptions. Just as a term 'component' used below, the combination of software and/or hardware with predetermined functions can be realized. Although the device described by the following embodiment is better realized by the software, the realization of the hardware and the combination of the software and the hardware may be possible and may be constructed.

Figure 2:
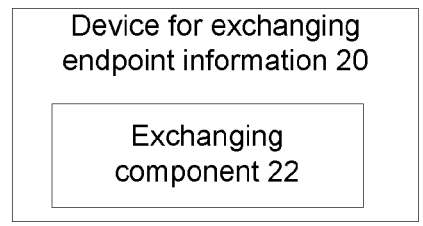
FIG. 2 is a structure block diagram of a device for exchanging endpoint information according to an embodiment of the present disclosure.

FIG. 2 is a structure block diagram of a device for exchanging endpoint information according to an embodiment of the present disclosure. As shown in FIG. 2, the device for exchanging endpoint information 20 includes an exchanging component 22, and the exchanging component 22 is described below.

The exchanging component 22 is configured to exchange multiplexing information between the telepresence endpoints.

Figure 3:
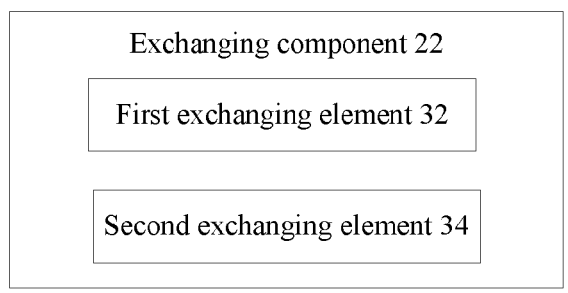
FIG. 3 is a first examplary structure block diagram of the exchanging component 22 in the device for exchanging endpoint information according to an embodiment of the present disclosure.

FIG. 3 is a first examplary structure block diagram of the exchanging component 22 in the device for exchanging endpoint information according to an embodiment of the present disclosure. As shown in FIG. 3, the exchanging component 22 comprises at least one of: a first exchanging element 32 and a second exchanging element 34, and the exchanging component 22 is described below.

The first exchanging element 32 is configured to exchange multiplexing indication information comprised in the multiplexing information when exchanging a terminal capability set; and the second exchanging element 34 is configured to exchange multiplexing indication information comprised in the multiplexing information when setting up a call.

Figure 4:
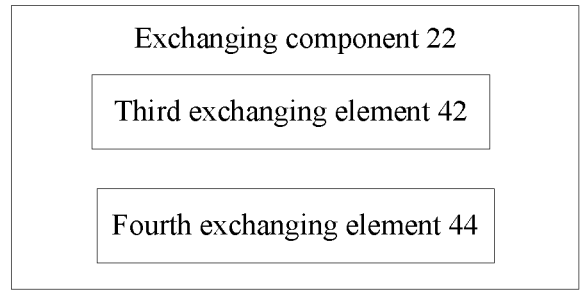
FIG. 4 is a second examplary structure block diagram of the exchanging component 22 in the device for exchanging endpoint information according to an embodiment of the present disclosure.

FIG. 4 is a second examplary structure block diagram of the exchanging component 22 in the device for exchanging endpoint information according to an embodiment of the present disclosure. As shown in FIG. 4, the exchanging component 22 comprises at least one of: a third exchanging element 42 and a fourth exchanging element 44, and the exchanging component 22 is described below.

The third exchanging element 42 is configured to exchange multiplexing type information comprised in the multiplexing information when exchanging a terminal capability set; and the fourth exchanging element 44 is configured to exchange multiplexing type information comprised in the multiplexing information when setting up a call.

Figure 5:
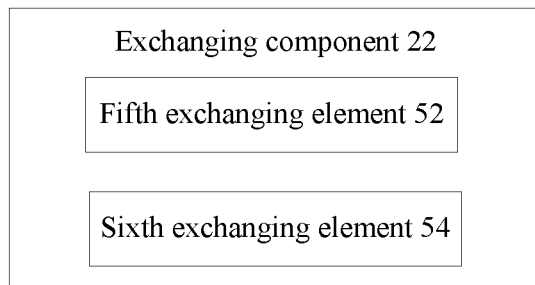
FIG. 5 is a third examplary structure block diagram of the exchanging component 22 in the device for exchanging endpoint information according to an embodiment of the present disclosure.

FIG. 5 is a third examplary structure block diagram of the exchanging component 22 in the device for exchanging endpoint information according to an embodiment of the present disclosure. As shown in FIG. 5, the exchanging component 22 comprises at least one of: a fifth exchanging element 52 and a sixth exchanging element 54, and the exchanging component 22 is described below.

The fifth exchanging element 52 is configured to, in a signalling exchange process, exchange multiplexing mapping information by carrying the multiplexing mapping information in signalling information; and the sixth exchanging element 54 is configured to, when transmitting a media stream, exchange the multiplexing mapping information by carrying the multiplexing mapping information at an extended header of the transmitting media stream.

Figure 6:
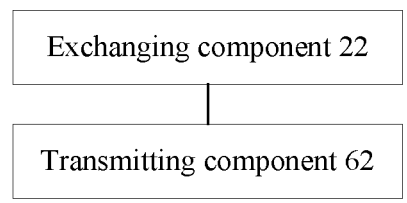
FIG. 6 is an examplary structure block diagram of the device for exchanging endpoint information according to an embodiment of the present disclosure.

FIG. 6 is an examplary structure block diagram of the device for exchanging endpoint information according to an embodiment of the present disclosure. As shown in FIG. 6, the device further comprises a transmitting component 62 in addition to all the components shown in FIG. 2, and the transmitting component 62 is described below.

The transmitting component 62 is connected to the exchanging component 22 and is configured to perform multiplexing transmission on a media stream according to a result of exchanging the multiplexing information.

Figure 7:
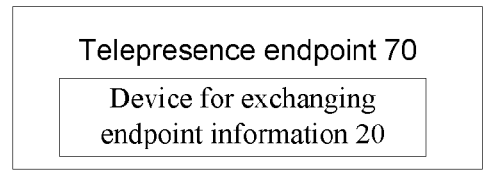
FIG. 7 is a structure block diagram of a telepresence endpoint according to an embodiment of the present disclosure.

FIG. 7 is a structure block diagram of a telepresence endpoint according to an embodiment of the present disclosure. As shown in FIG. 7, the telepresence endpoint 70 comprises the device for exchanging endpoint information 20 according to any one of the content mentioned above.

The examplary implementation modes of the present disclosure are described below with reference to the drawings.

For solving the problem in the related art, in the embodiment, on the basis of a conventional protocol, a method for carrying multiplexing transmission information in a telepresence system is proposed. The method comprises that: telepresence endpoints exchange multiplexing transmission indication (which is a part of the above mentioned multiplexing information).

Figure 8:
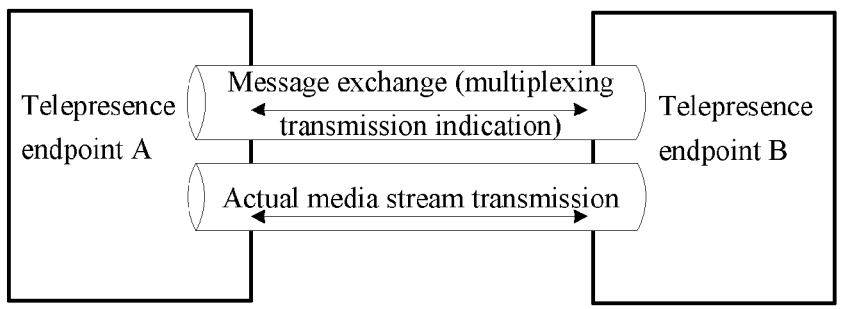
FIG. 8 is a flowchart of implementing the multiplexing transmission indication when the telepresence endpoints perform message exchange according to an examplary implementation mode of the present disclosure.

When a telepresence endpoint transmits media stream by multiplexing, a multiplexing transmission indication needs to be given during message exchange. FIG. 8 is a flowchart of implementing the multiplexing transmission indication when the telepresence endpoints perform message exchange according to an examplary implementation mode of the present disclosure. As shown in FIG. 8, a terminal A and a terminal B are the telepresence endpoints, a multiplexing transmission indication is given when message exchange is performed between the telepresence endpoint A and the telepresence endpoint B, and actual media stream transmission is performed between the two telepresence endpoints after the multiplexing transmission indication is exchanged.

Figure 9:
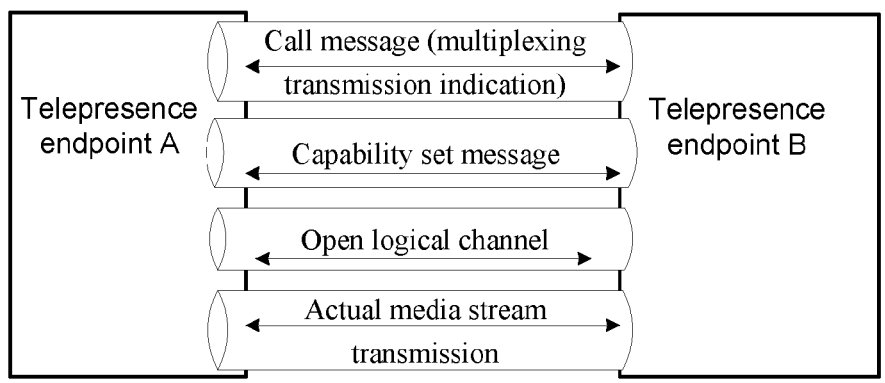
FIG. 9 is a flowchart of implementing the multiplexing transmission indication when the telepresence endpoints send a call message according to an examplary implementation mode of the present disclosure.

FIG. 9 is a flowchart of implementing the multiplexing transmission indication when the telepresence endpoints send a call message according to an examplary implementation mode of the present disclosure. As shown in FIG. 9, the terminal A and the terminal B are the telepresence endpoints, and the telepresence endpoint A and the telepresence endpoint B give the multiplexing transmission indications in a call message by using an H.323 GEF. A sending end can give the multiplexing transmission indication in a setup message, and a receiving end can give the multiplexing transmission indication in an altering or connect message. When the multiplexing transmission indications are supported by the GEF, intermediate devices such as a Gate Keeper (GK) need to support the GEF, besides the terminals support the GEF.

Figure 10:
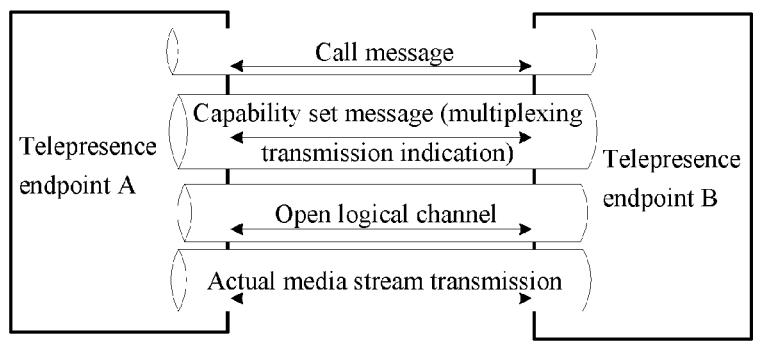
FIG. 10 is a flowchart of implementing a multiplexing transmission indication when telepresence endpoints send capability set messages according to an examplary implementation mode of the present disclosure.

FIG. 10 is a flowchart of implementing a multiplexing transmission indication when telepresence endpoints send capability set messages according to an examplary implementation mode of the present disclosure. As shown in FIG. 10, the terminal A and the terminal B are the telepresence endpoints, and the telepresence endpoint A and the telepresence endpoint B can give the multiplexing transmission indications in terminal capability set messages: TerminalCapabilitySet or an offer/answer model message.

The multiplexing transmission indication of the telepresence endpoints comprises clear indicating using of multiplexing and/or indicating a multiplexing type.

When there is a lack of the multiplexing transmission indication of the telepresence endpoints, multiplexing transmission will not be adopted.

The telepresence endpoints need to describe mapping of multiplexing. The telepresence endpoints need to describe mapping from a media capture code stream to a Real-time Transport Protocol (RTP) stream.

Figure 11:
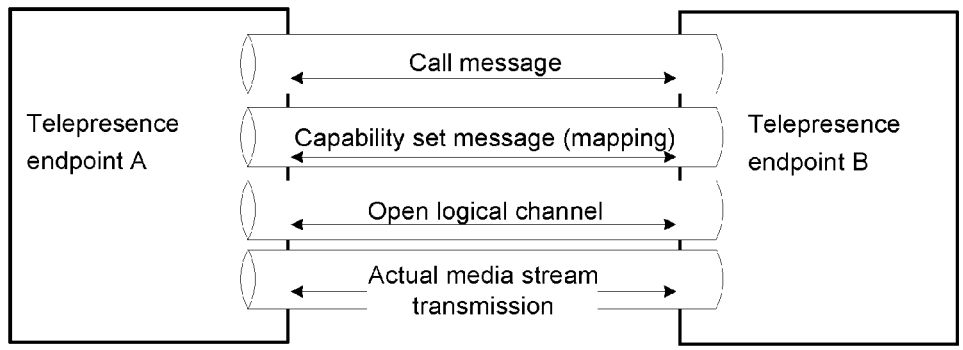
FIG. 11 is a flowchart of performing mapping when telepresence endpoints send a capability set message according to an examplary implementation mode of the present disclosure.

FIG. 11 is a flowchart of performing mapping when telepresence endpoints send a capability set message according to an examplary implementation mode of the present disclosure. As shown in FIG. 11, in a first mapping mode, the terminal A and the terminal B are the telepresence endpoints, and the telepresence endpoint A and the telepresence endpoint B can perform mapping in at least one of messages: the terminal capability set message TerminalCapabilitySet, and the offer/answer model message in a CLUE message.

Figure 12:
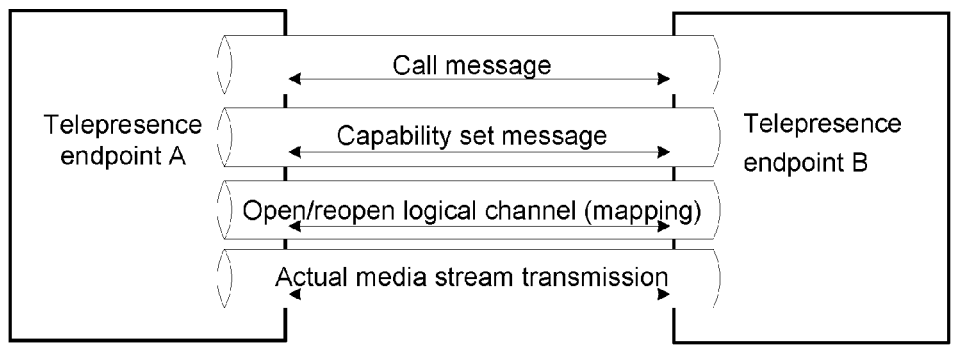
FIG. 12 is a flowchart of performing mapping when telepresence endpoints send an open logical channel message according to an examplary implementation mode of the present disclosure.

FIG. 12 is a flowchart of performing mapping when telepresence endpoints send an open logical channel message according to an examplary implementation mode of the present disclosure. As shown in FIG. 12, in a second mapping mode, the terminal A and the terminal B are the telepresence endpoints, and the telepresence endpoint A and the telepresence endpoint B perform mapping during opening or reopening of a logical channel.

The examplary implementation modes of the present disclosure are described below with reference to the drawings.

A substantial flow of completing a media call via the terminals may comprise: a call flow, a capability set exchange flow, a media stream transmission channel preparation (logical channel opening) flow and an actual media stream transmission flow.

Exemplary implementation mode 1: H.323-based telepresence endpoints give indications when sending a call message When the H.323-based telepresence endpoints send the call message, the sending end can give an indication in a Setup message, and the receiving end can give an indication in an Altering or Connect message.

By means of the method, the multiplexing transmission indication will be given in the call message by the terminals, and opposite ends are informed as soon as possible of that the media stream will be transmitted in a multiplexing mode. When the method is adopted, and a message passes through the GateKeeper (GK), the indication parts may be altered or deleted by the GK.

Figure 13:
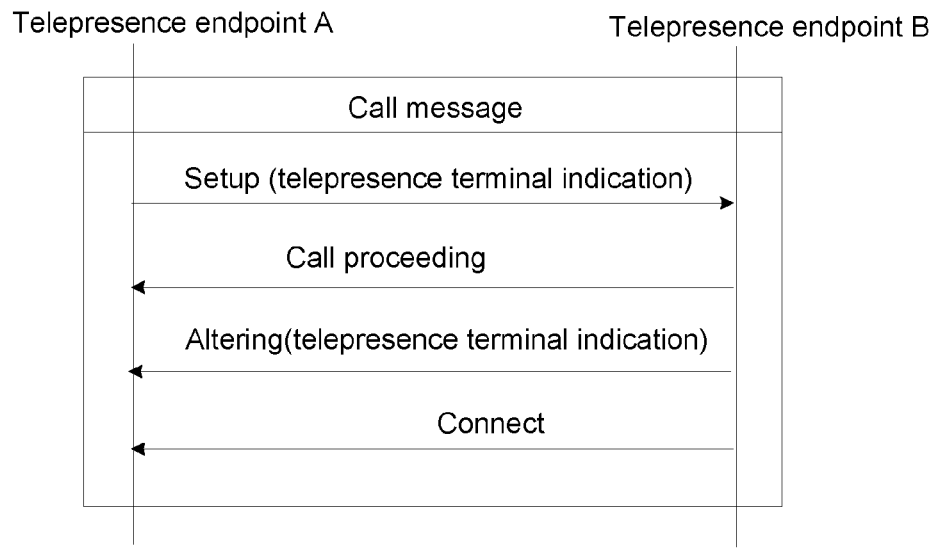
FIG. 13 is a flowchart of implementing an indication 1 when H.323-based telepresence endpoints send a call message according to an examplary implementation mode of the present disclosure.

FIG. 13 is a flowchart of implementing an indication 1 when H.323-based telepresence endpoints send a call message according to an examplary implementation mode of the present disclosure. As shown in FIG. 13, the terminal A and the terminal B are the telepresence endpoints, the terminal A sends the Setup message to the terminal B, wherein a multiplexing indication is carried in the Setup message; after receiving the Setup message, the terminal B determines, by analysis, that the terminal A will transmit the media stream by multiplexing; after sending a Call proceeding message to the terminal A, the terminal B sends the Altering message carrying the multiplexing indication to the terminal A; and after receiving the Altering message, the terminal A determines, by analysis, that the terminal B will transmit the media stream in the multiplexing manner; and the terminal B sends the Connect message to the terminal A.

Figure 14:
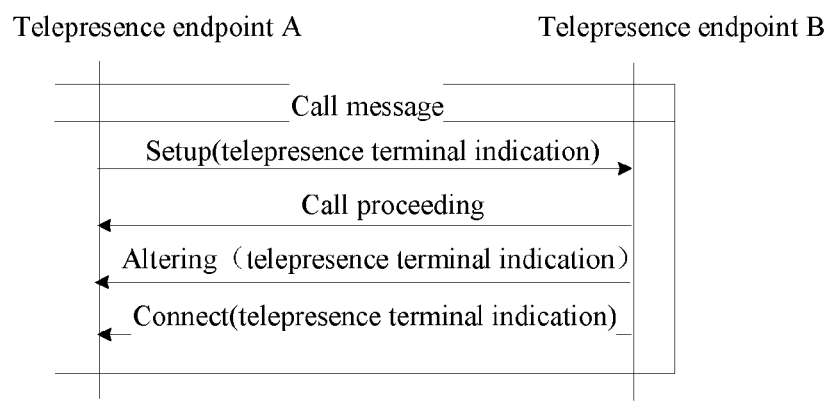
FIG. 14 is a flowchart of implementing an indication 2 when H.323-based telepresence endpoints send a call message according to an examplary implementation mode of the present disclosure.

FIG. 14 is a flowchart of implementing an indication 2 when H.323-based telepresence endpoints send a call message according to an examplary implementation mode of the present disclosure. As shown in FIG. 14, the terminal A and the terminal B are the telepresence endpoints, the terminal A sends the Setup message to the terminal B, wherein the multiplexing indication is carried in the Setup message; and after receiving the Setup message, the terminal B determines, by analysis, that the terminal A will transmit the media stream by multiplexing; after sending the Call proceeding message and the Altering message to the terminal A, the terminal B sends the Connect message carrying the multiplexing indication to the terminal A; and after receiving the Connect message, the terminal A determines, by analysis, that the terminal B will transmit the media stream in the multiplexing manner.

Figure 15:
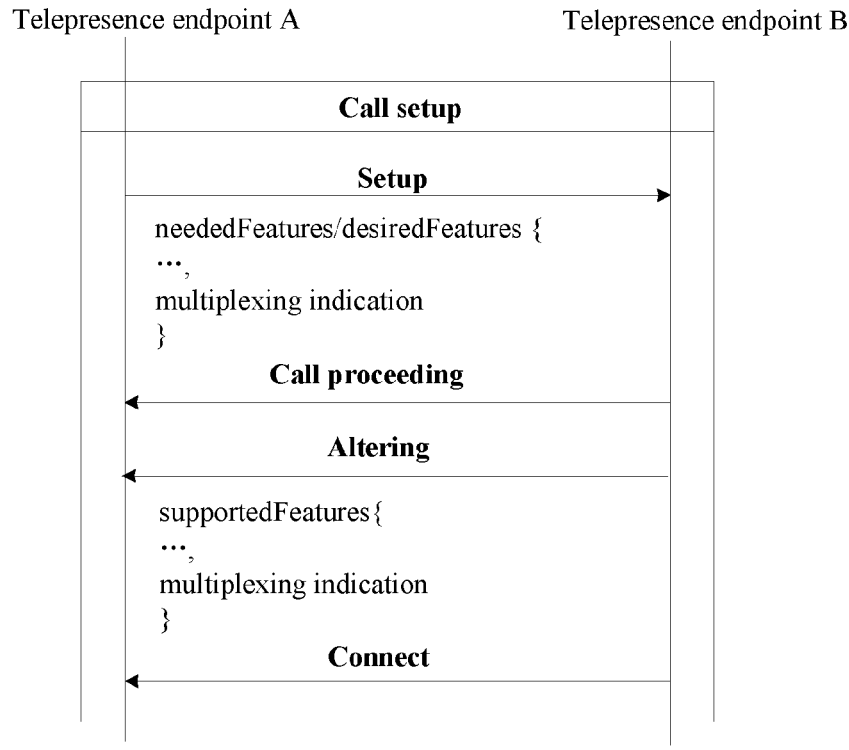
FIG. 15 is a flowchart of implementing an indication 1 when H.323-based telepresence endpoints adopt a Generic Extensible Framework (GEF) according to an examplary implementation mode of the present disclosure.
Figure 16:
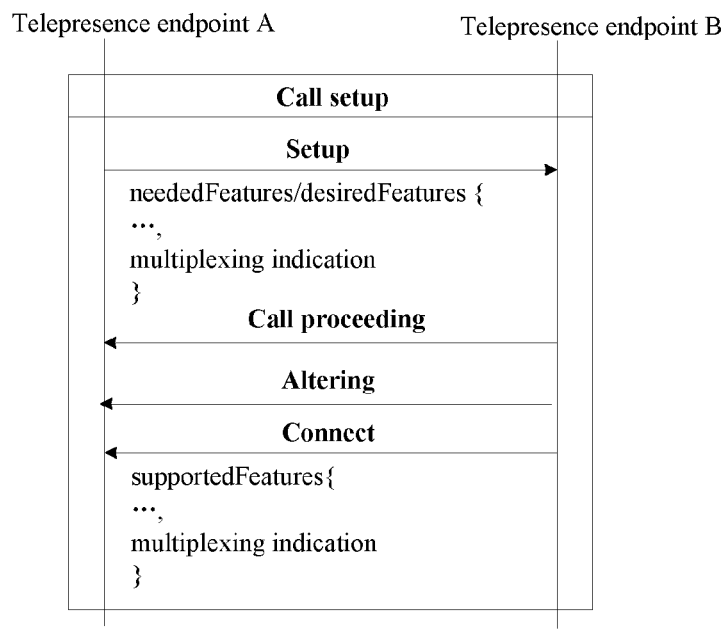
FIG. 16 is a flowchart of implementing an indication 2 when H.323-based telepresence endpoints adopt a GEF according to an examplary implementation mode of the present disclosure.

FIG. 15 is a flowchart of implementing an indication 1 when H.323-based telepresence endpoints adopt a GEF according to an examplary implementation mode of the present disclosure. FIG. 16 is a flowchart of implementing an indication 2 when H.323-based telepresence endpoints adopt a GEF according to an examplary implementation mode of the present disclosure. As shown in FIG. 15 and FIG. 16, the terminal A and the terminal B are the telepresence endpoints, the telepresence sending terminals (the telepresence endpoint A and the telepresence endpoint B) can give indications by using parameters (neededFeatures or desiredFeatures) in the Setup message, and telepresence receiving terminals can give indications by using a supportedFeatures message in the Altering or Connect message.

Exemplary implementation mode 2: the H.323-based telepresence endpoints give indications when sending a terminal capability set By means of the method, a conventional protocol stack can be completely multiplexed, and a call flow does not need to be involved when the multiplexing transmission indication of the terminals is altered.

Figure 17:
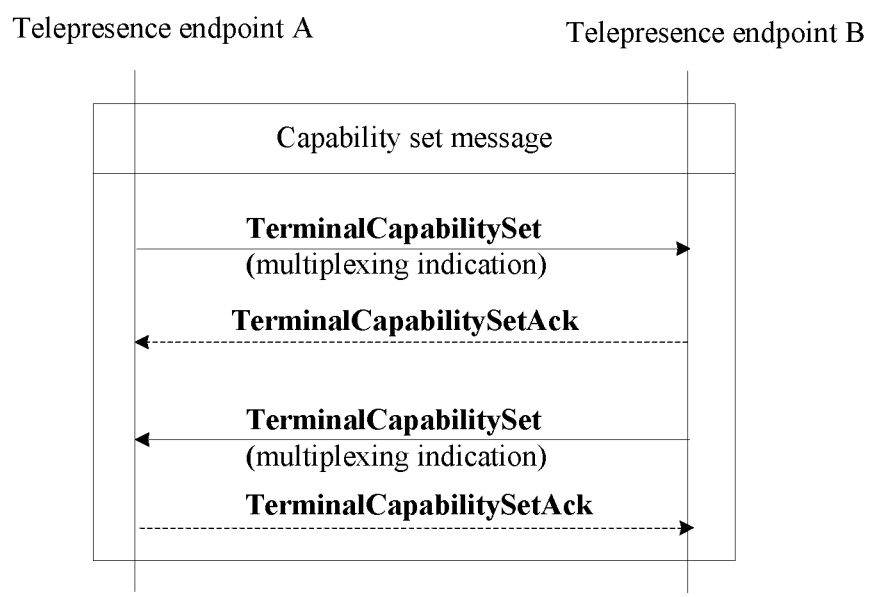
FIG. 17 is a flowchart of implementing an indication when H.323-based telepresence endpoints send a terminal capability set message according to an examplary implementation mode of the present disclosure.

FIG. 17 is a flowchart of implementing an indication when H.323-based telepresence endpoints send a terminal capability set message according to an examplary implementation mode of the present disclosure. As shown in FIG. 17, the terminal A and the terminal B are the telepresence endpoints. The terminal A sends the terminal capability set message (TerminalCapabilitySet) carrying the multiplexing indication of the telepresence endpoints to the terminal B; after the terminal B receives the message sent by the terminal A, it is parsed that the multiplexing indication exists, so as to determine that the terminal A will transmit the media stream by multiplexing and a multiplexing transmission type is substantially described; the terminal B sends a terminal capability set response message (TerminalCapabilitySetAck) to the terminal A; the terminal B sends the terminal capability set message (TerminalCapabilitySet) carrying the multiplexing indication to the terminal A; after the terminal A receives the message sent by the terminal B, it is parsed that the multiplexing indication exists, so as to determine that the terminal B will adopt the multiplexing transmission mode and the multiplexing transmission type is substantially described; and the terminal A sends the terminal capability set response message (TerminalCapabilitySetAck) to the terminal B.

Figure 18:
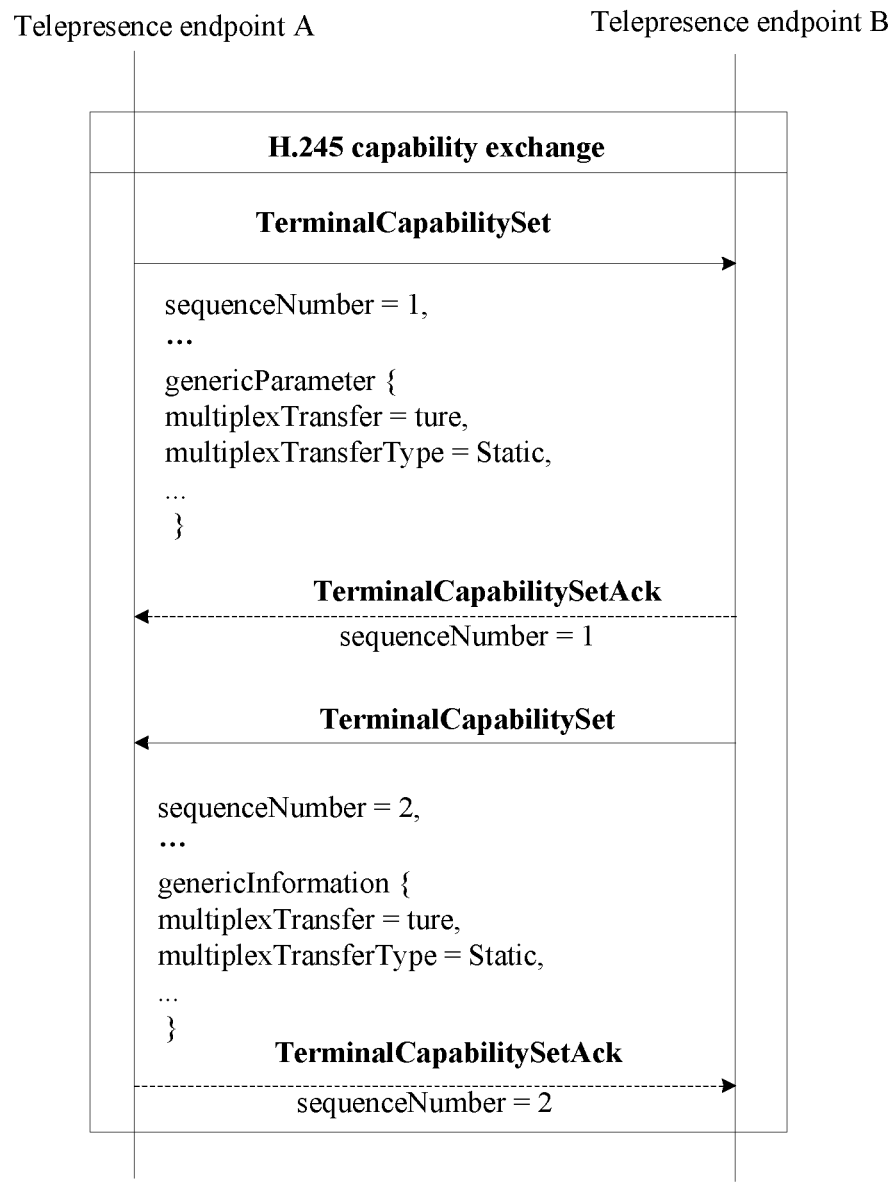
FIG. 18 is a flowchart of implementing an indication when H.323-based telepresence endpoints adopt a generic parameter according to an examplary implementation mode of the present disclosure.

FIG. 18 is a flowchart of implementing an indication when H.323-based telepresence endpoints adopt a generic parameter according to an examplary implementation mode of the present disclosure. As shown in FIG. 18, the terminal A and the terminal B are the telepresence endpoints. The multiplexing indication can be given between the terminals in the terminal capability set message by using the generic parameter. In FIG. 18, the multiplexing parameter relates to supporting or not of multiplexing (multiplexTransfer) and the type of multiplexing (multiplexTransferType). When the terminals decide to adopt multiplexing, fields for judging whether to support multiplexing can be omitted, and the multiplexing indication is given only by the multiplexing type. The receiving end parses multiplexing type fields, and it is represented that the sending end supports multiplexing. When the terminals do not adopt multiplexing, a value of multiplexTransfer can be set to be false or the multiplexing indication is not carried.

When there is a lack of the multiplexing indication in the capability set message, it is represented that the media stream is transmitted in a non-multiplexing mode, namely one transmission address is used for transmitting one path of media stream.

Figure 19:
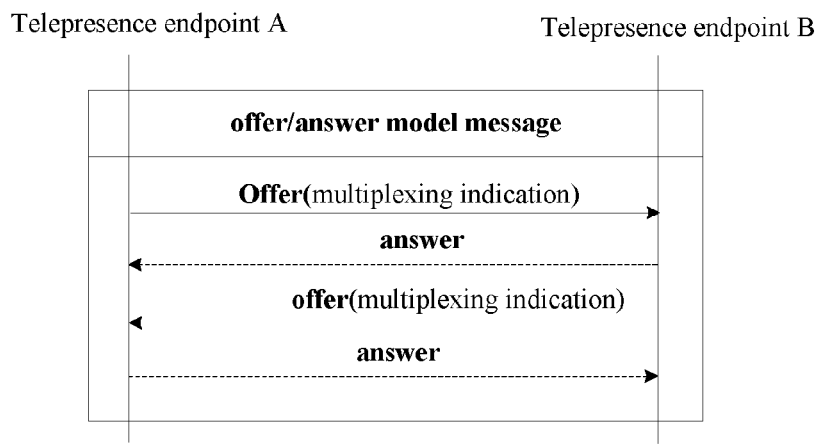
FIG. 19 is a flowchart of implementing an indication 1 when Session Initiation Protocol (SIP)-based telepresence endpoints adopt an offer/answer model according to an examplary implementation mode of the present disclosure.

Exemplary implementation mode 3: SIP-based telepresence endpoints given indications in an offer/answer model message FIG. 19 is a flowchart of implementing an indication 1 when SIP-based telepresence endpoints adopt an offer/answer model message according to an examplary implementation mode of the present disclosure. As shown in FIG. 19, the SIP-based telepresence endpoints give the multiplexing indication in the offer/answer model message by using two pairs of messages. The terminal A and the terminal B are the telepresence endpoints. The terminal A sends an offer message carrying the multiplexing indication to the terminal B, and the terminal B parses the message to determine that the terminal A will send the media stream in the multiplexing manner. The terminal B returns an answer message to the terminal A. The terminal B sends an offer message carrying the multiplexing indication to the terminal A, and the terminal A parses the message to determine that the terminal B will also send the media stream in the multiplexing manner. The terminal A returns an answer message to the terminal B.

Figure 20:
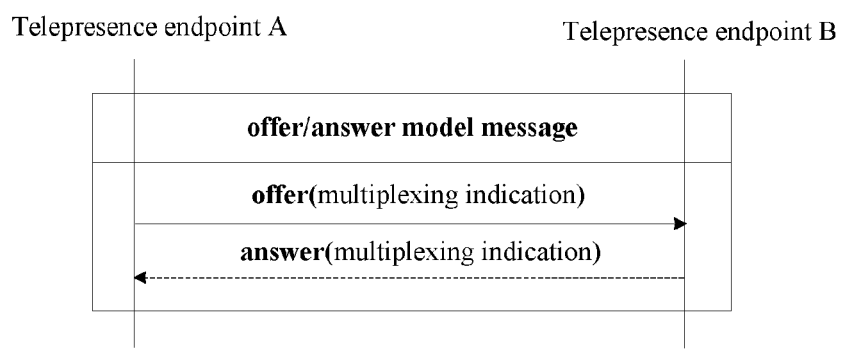
FIG. 20 is a flowchart of implementing an indication 2 when SIP-based telepresence endpoints adopt an offer/answer model according to an examplary implementation mode of the present disclosure.

FIG. 20 is a flowchart of implementing an indication 2 when SIP-based telepresence endpoints adopt an offer/answer model according to an examplary implementation mode of the present disclosure. As shown in FIG. 20, the SIP-based telepresence endpoints give the multiplexing indication in the offer/answer model message by using a pair of messages. The terminal A and the terminal B are the telepresence endpoints. The terminal A sends an offer message carrying the multiplexing indication to the terminal B, and the terminal B parses the message to determine that the terminal A will send the media stream in the multiplexing mode. The terminal B sends an answer message carrying the multiplexing indication to the terminal A, and the terminal A parses the message to determine that the terminal B will also send the media stream in the multiplexing mode.

Exemplary implementation mode 4: the telepresence endpoints perform mapping in the terminal capability set message TerminalCapabilitySet After it is determined that multiplexing (multiplexing indication) and multiplexing types are adopted, a multiplexing mapping type can comprise static mapping, dynamic mapping and comprehensive mapping.

the static mapping refers to that, during the signalling exchange process, a mapping relationship between the RTP stream and the media capture code stream, such as a mapping relationship between an identifier of the RTP stream and an identifier of the media capture code stream, is carried in a message. The identifier of the RTP stream can be used for uniquely identifying one path of RTP stream by using a Synchronous Source (SSRC), and the identifier of the media capture code stream can be used for uniquely identifying one path of media capture code stream by using a captureID (media capture ID) and an encodingID (the coding ID used for coding this path of captureID); or a new field such as a media capture code stream identifier (demultiplexID) is adopted to identify one path of media capture code stream, and a corresponding relationship exists between the demultiplexID and the captureID, the encodingID substantially. In a static mapping mode, the mapping relationship is informed only in signalling exchange, an RTP header field in an actual media stream does not need to be extended for mapping, and the steps of receiving an RTP media stream by the terminals are not changed.

During the dynamic mapping, mapping between the RTP stream and the media capture code stream are not described in a signalling. When a new field demultiplexID is adopted to describe the media capture code stream, a mapping relationship between the demultiplexID and the captureID, the encodingID is exchanged in the signalling; and when the captureID and the encodingID are adopted to describe the media capture code stream, the new field is not adopted to describe the media capture code stream, and any mapping does not need to be carried in the signalling. During dynamic mapping, an RTP header needs to be extended by the terminals, the identifier of the media capture code stream (demultiplexID or captureID, encodingID) is filled, and the terminals need to parse an extended part of the header of the RTP stream, so as to dynamically obtain the mapping relationship between the media capture code stream and the RTP stream.

The comprehensive mapping is the combination of the static mapping and the dynamic mapping. The mapping relationship between the RTP stream and the media capture code stream is described in signalling exchange, the RTP header is also extended, and the identifier of the media capture code stream is carried in the extended header. For example, the receiving end expects the sending end to send the media capture code stream (captureID=1 and encodingID=1) to the receiving end, and a static mapping relationship that the RTP stream (SSRC=1) corresponds to the media capture code stream (captureID=1 and encodingID=1) is known. In addition to the maintenance of the static mapping relationship, the sending end extends a mapping field at the header of the RTP stream (SSRC=1), and fills captureID=1 and encodingID=1. Under common conditions, the terminals parse each RTP stream according to the static mapping relationship, and after the receiving end receives multiple paths of RTP streams, the needed multiple paths of streams can be processed according to the maintained static relationship between the RTP stream (SSRC=1) and the media capture code stream (captureID=1 and encodingID=1). Under special conditions such as that a static mapping maintenance table is lost or there is a mistake in the static mapping maintenance contents, multiple paths of received streams can be processed in a dynamic mapping manner, the extended part of the header of the RTP stream of each path of stream is parsed to obtain the captureID and the encodingID corresponding to each path of stream, and the selected media capture code stream captureID and encodingID corresponding to a certain path of RTP stream can be determined.

Figure 21:
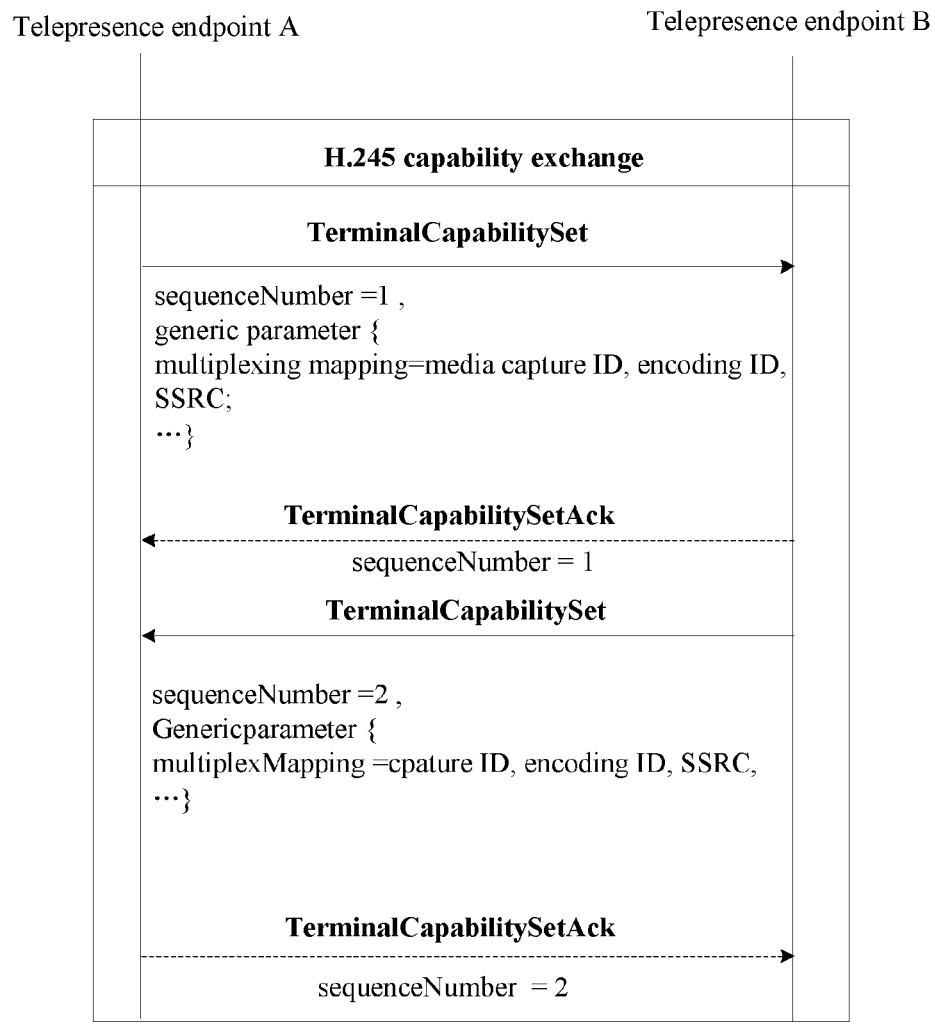
FIG. 21 is a flowchart of performing mapping of a telepresence terminal in a terminal capability set message according to an examplary implementation mode of the present disclosure.

Next, how to map in the terminal capability set message TerminalCapabilitySet by the telepresence endpoints is introduced. FIG. 21 is a flowchart of performing mapping of a telepresence terminal in a terminal capability set message according to an examplary implementation mode of the present disclosure. As shown in FIG. 21, the terminal A and the terminal B are the telepresence endpoints, the terminal A sends a TerminalCapabilitySet message carrying a mapping relationship to the terminal B, and the terminal B receives and maintains the mapping relationship; the terminal B sends ACK to the terminal A; the terminal B sends the TerminalCapabilitySet message carrying the mapping relationship to the terminal A, and the terminal A receives and maintains the mapping relationship; and the terminal A sends ACK to the terminal B.

Figure 22:
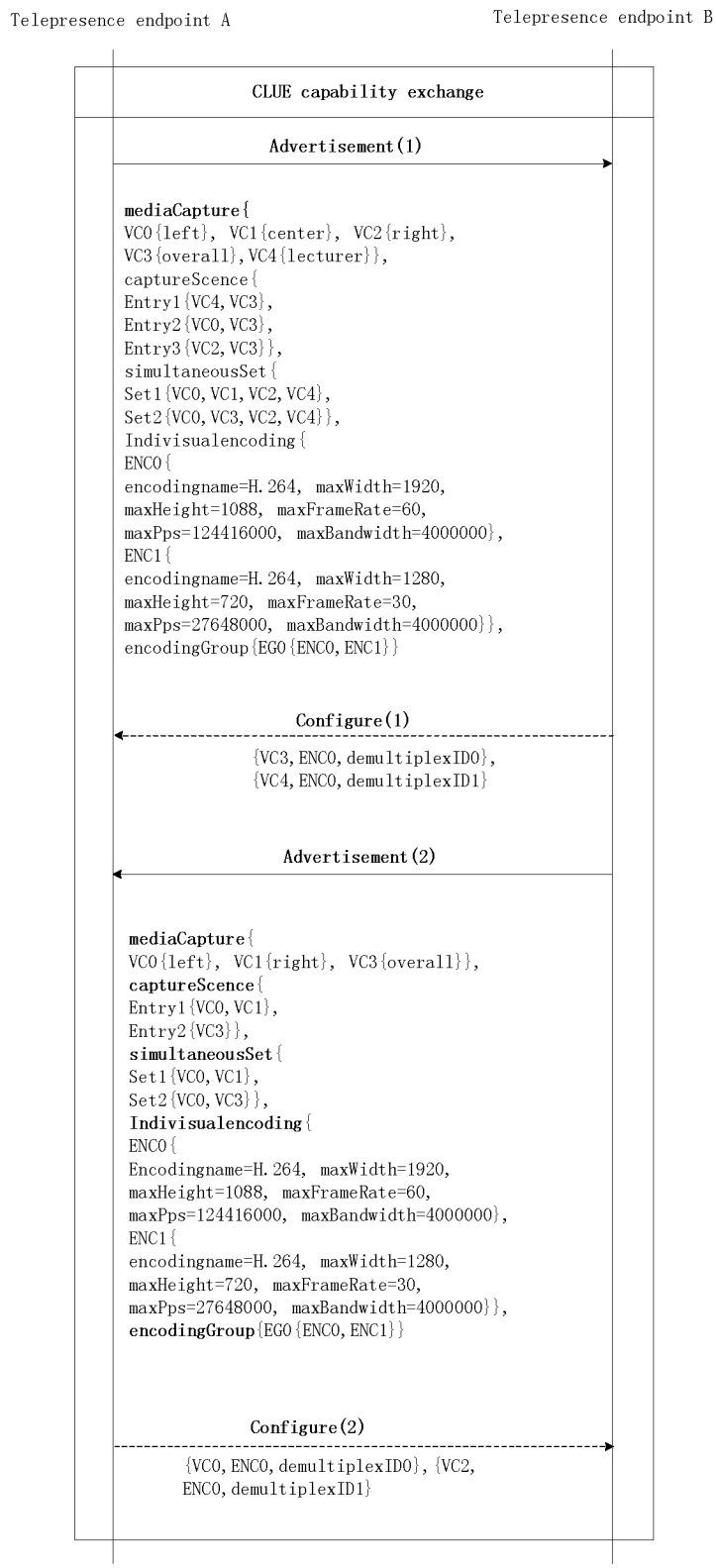
FIG. 22 is a flowchart of performing mapping of a telepresence terminal in a CLUE message according to an examplary implementation mode of the present disclosure.

Exemplary implementation mode 5: the telepresence endpoints perform mapping in the CLUE message FIG. 22 is a flowchart of performing mapping of a telepresence terminal in a CLUE message according to an examplary implementation mode of the present disclosure. As shown in FIG. 22, when the terminals exchange a capability set by using the CLUE message based on a CLUE channel, the telepresence endpoints can perform mapping in the CLUE message. The terminal A and the terminal B are the telepresence endpoints. The terminal A sends an advertisement message (advertisement) to the terminal B, wherein the advertisement message comprises all media capture streams information and encoding information capable of being provided by the terminal A; the terminal B selects two of multiple paths of stream, associates a field (demultiplexID) with a captureID (VC) and an encodingID (ENC), and then sends to the terminal A in a configuration message (configure); after the terminal A receives the configuration message, the demultiplexID is adopted as an extended header of each path of RTP stream, and after the terminal B receives the RTP stream, the extended header can be parsed to obtain a needed mapping relationship. The process of sending the advertisement message to the terminal A by the terminal B and the process of sending the configuration message to the terminal B by the terminal A are consistent to the abovementioned process without repetition.

Figure 23:
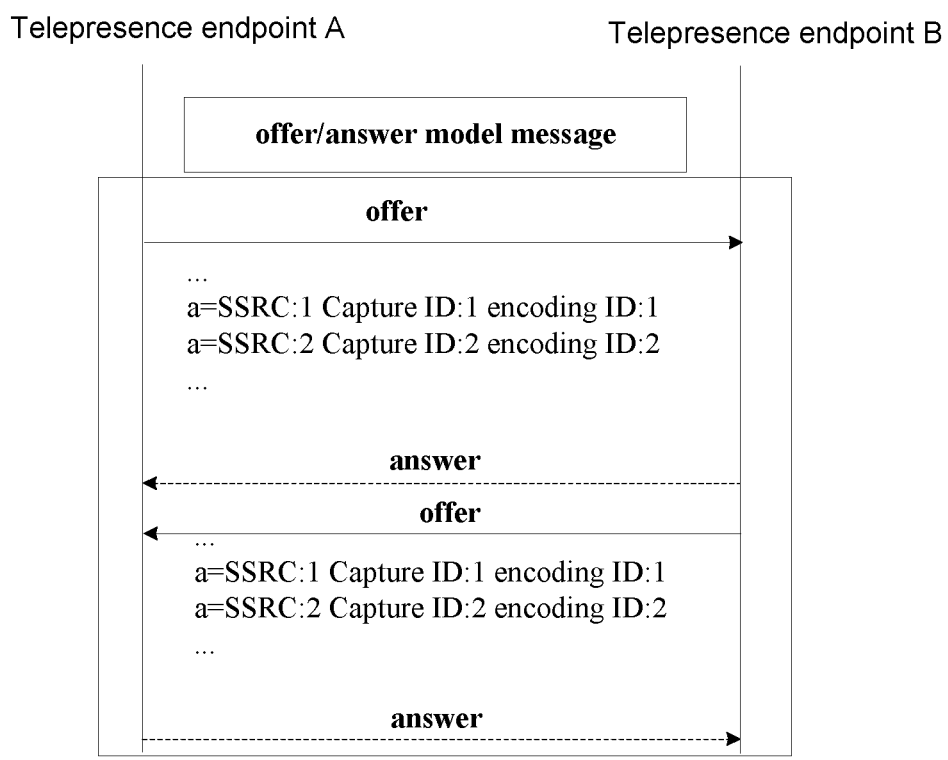
FIG. 23 is a flowchart of performing mapping of a telepresence terminal in an offer/answer model message according to an examplary implementation mode of the present disclosure.

Exemplary implementation mode 6: the telepresence endpoints perform mapping in the offer/answer model message FIG. 23 is a flowchart of performing mapping of a telepresence terminal in an offer/answer model message according to an examplary implementation mode of the present disclosure. As shown in FIG. 23, the terminal A and the terminal B are the telepresence endpoints, and mapping is performed in the offer/answer model message. The carrier of an offer/answer model generally adopts, but not limited to, an invite/200 OK message. The terminal A sends an offer message carrying multiplexing mapping to the terminal B, and after receiving the offer message, the terminal B maintains a mapping relationship. The terminal B sends an answer message to the terminal A. The process of sending the message to the terminal A by the terminal B is consistent to the abovementioned process without repetition.

Figure 24:
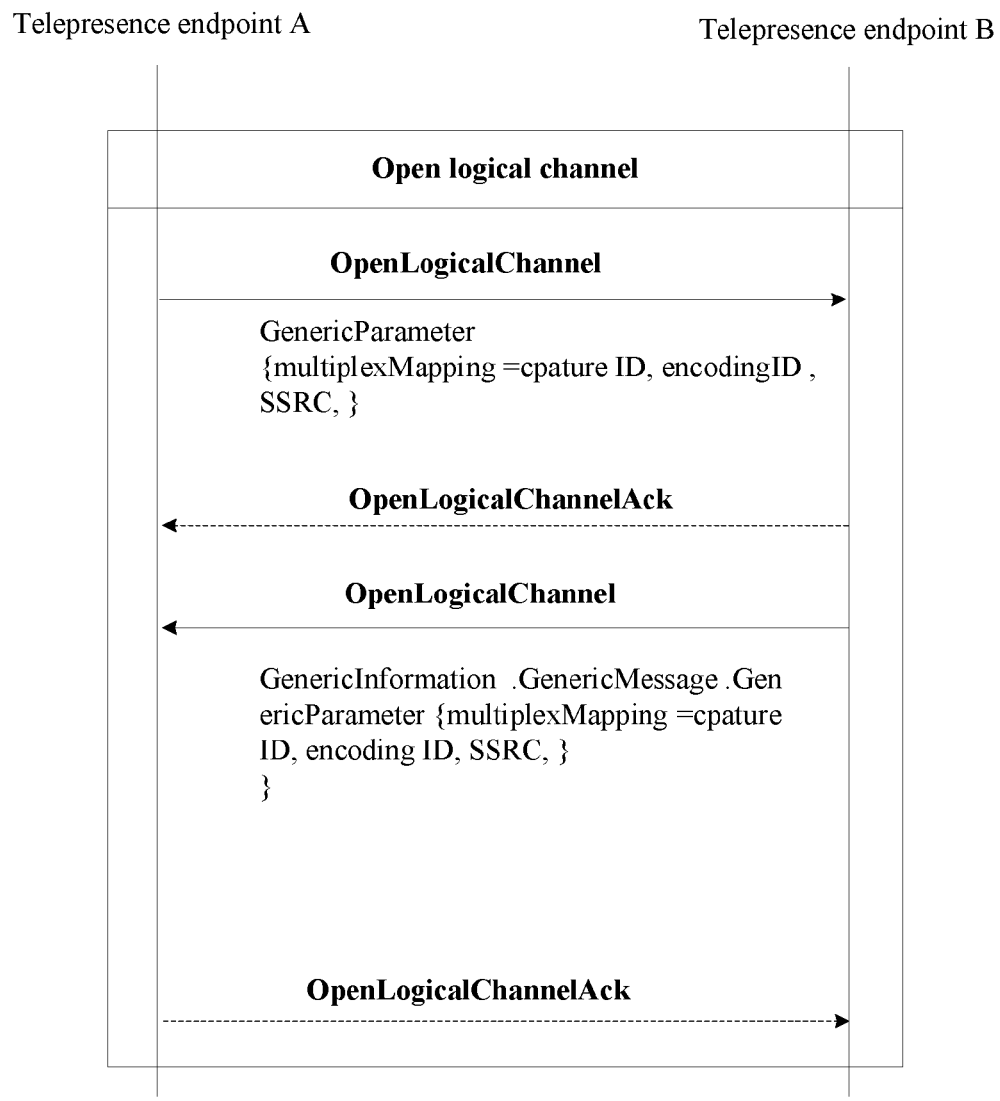
FIG. 24 is a flowchart of performing mapping of a telepresence terminal during opening of a logical channel according to an examplary implementation mode of the present disclosure.

Exemplary implementation mode 7: the telepresence endpoints perform mapping during opening of a logical channel FIG. 24 is a flowchart of performing mapping of a telepresence terminal during opening of a logical channel according to an examplary implementation mode of the present disclosure. As shown in FIG. 24, the telepresence endpoints perform mapping from the media capture code stream to the RTP stream during the opening of the logical channel. The terminal A and the terminal B are the telepresence endpoints, the terminal A sends an OpenLogicalChannel (OLC) message carrying a mapping relationship to the terminal B, and the mapping relationship is borne by using a generic parameter field in a generic message in an OLC. The terminal B returns an open logical channel response message to the terminal A. The terminal B sends the OLC message carrying the mapping relationship to the terminal A. The terminal A returns a response to the terminal B.

Figure 25:
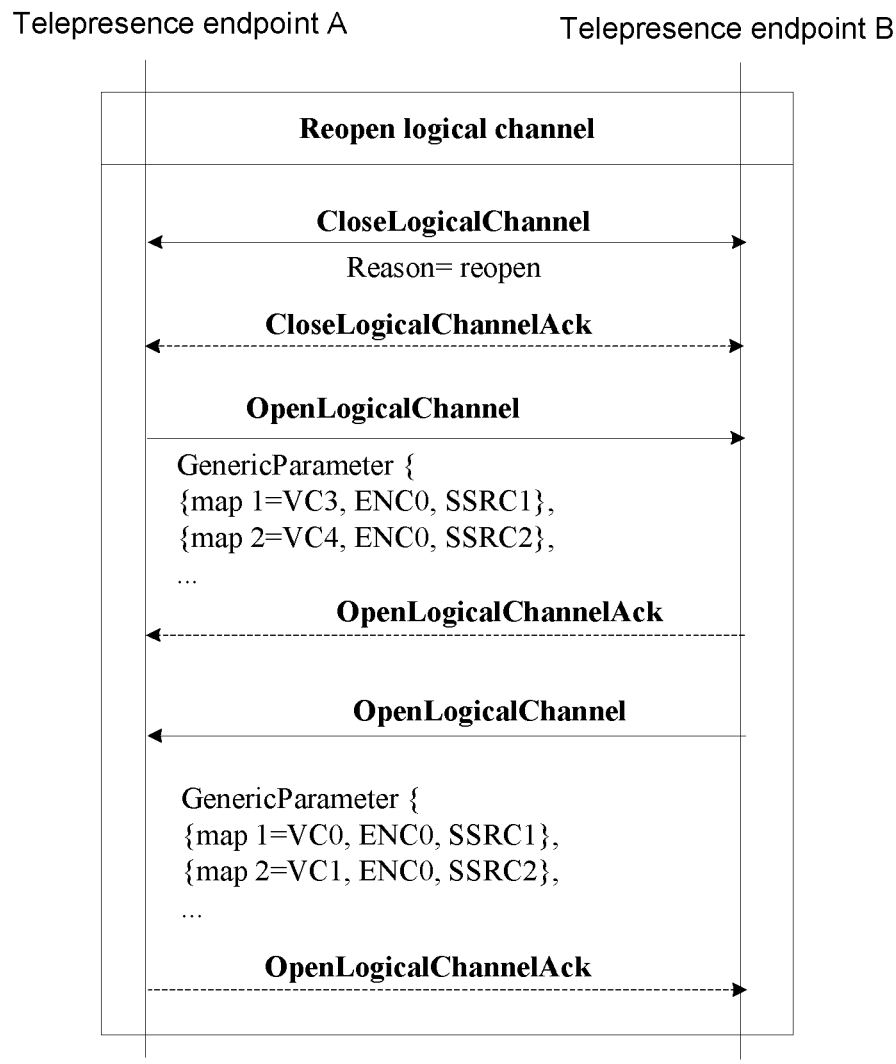
FIG. 25 is a flowchart of performing mapping of a telepresence terminal during reopening of a logical channel according to an examplary implementation mode of the present disclosure.

Exemplary implementation mode 8: the telepresence endpoints perform mapping during reopening of the logical channel FIG. 25 is a flowchart of performing mapping of a telepresence terminal during reopening of a logical channel according to an examplary implementation mode of the present disclosure. As shown in FIG. 25, the telepresence endpoints perform mapping during reopening of the logical channel. The terminal A and the terminal B are the telepresence endpoints. A conventional logical channel between the terminal A and the terminal B is closed firstly, and then a new logical channel is opened. The terminal A sends an OLC message carrying a mapping relationship to the terminal B. The terminal B returns an open logical channel response message to the terminal A. The terminal B sends a OLC message carrying the mapping relationship to the terminal A. The terminal A returns an open logical channel response to the terminal B.

Obviously, those skilled in the art should understand that all modules or all steps in the present disclosure can be realized by using a generic computation device, can be centralized on a single computation device or can be distributed on a network composed of a plurality of computation devices. Optionally, they can be realized by using executable program codes of the computation devices, so that they can be stored in a storage device and executed by the computation devices, the shown or described steps can be executed in a sequence different from this sequence under certain conditions, or they are manufactured into each integrated circuit module respectively, or a plurality of modules or steps therein are manufactured into a single integrated circuit module. Thus, the present disclosure is not limited to combination of any specific hardware and software.

The above is only the examplary embodiments of the present disclosure, and is not intended to limit the present disclosure. There can be various modifications and variations in the present disclosure for those skilled in the art. Any modifications, equivalent replacements, improvements and the like within the spirit and principle of the present disclosure shall fall within the protection scope of the present disclosure.

INDUSTRIAL APPLICABILITY

As mentioned above, the method and device for exchanging endpoint information and the telepresence endpoint provided by the embodiments of the present disclosure can bring the following beneficial effects that: the problem in the related art that there are too many ports and multiplexing transmission is unsmooth due to the fact that the multiplexing transmission mode of the traditional session system is still adopted in the telepresence system based on the conventional protocol architecture is solved, and the effect of exchanging the multiplexing information between the telepresence endpoints and therefore multiplexing can be successfully performed in the telepresence system is further achieved.

What is claimed is:

1. A method for exchanging endpoint information, comprising:
   telepresence endpoints exchanging multiplexing information:
   wherein the multiplexing information comprises multiplexing mapping information used for describing a mapping relationship between a media capture code stream and a transmission code stream;
   wherein the telepresence endpoints exchange the multiplexing mapping information in at least one of the following manners: in a signalling exchange process, the telepresence endpoints exchanging the multiplexing mapping information by carrying the multiplexing mapping information in signalling information; and when transmitting a media stream, the telepresence endpoints exchanging the multiplexing mapping information by carrying the multiplexing mapping information at an extended header of the transmitting media stream.

2. The method as claimed in claim 1, wherein the multiplexing information further comprises at least one of:
   multiplexing indication information used for indicating whether a telepresence endpoint adopts multiplexing; and
   multiplexing type information used for indicating a multiplexing type by which the multiplexing mapping information is exchanged.

3. The method as claimed in claim 2, wherein the telepresence endpoints exchange the multiplexing indication information in at least one of following manners:
   the telepresence endpoints exchanging the multiplexing indication information when the telepresence endpoints are exchanging a terminal capability set; and
   the telepresence endpoints exchanging the multiplexing indication information when the telepresence endpoints are setting up a call.

4. The method as claimed in claim 2, wherein the telepresence endpoints exchange the multiplexing type information in at least one of following manners:
   the telepresence endpoints exchanging the multiplexing type information when the telepresence endpoints are exchanging a terminal capability set; and
   the telepresence endpoints exchanging the multiplexing type information when the telepresence endpoints are setting a call.

5. The method as claimed in claim 1, after the telepresence endpoints exchanging the multiplexing information, the method further comprising:
   performing multiplexing transmission on a media stream according to a result of exchanging the multiplexing information.

6. A device for exchanging endpoint information, applicable to telepresence endpoints, comprising:
   an exchanging component, configured to exchange multiplexing information:
   wherein the multiplexing information comprises multiplexing mapping information used for describing a mapping relationship between a media capture code stream and a transmission code stream;
   wherein the exchanging component comprises at least one of: a fifth exchanging element, configured to, in a signalling exchange process, exchange multiplexing mapping information by carrying the multiplexing mapping information in signalling information; and a sixth exchanging element, configured to, when transmitting a media stream, exchange the multiplexing mapping information by carrying the multiplexing mapping information at an extended header of the transmitting media stream.

7. The device as claimed in claim 6, wherein the exchanging component comprises at least one of:
   a first exchanging element, configured to exchange multiplexing indication information comprised in the multiplexing information when exchanging a terminal capability set; and
   a second exchanging element, configured to exchange multiplexing indication information comprised in the multiplexing information when setting up a call.

8. The device as claimed in claim 6, wherein the exchanging component comprises at least one of:
   a third exchanging element, configured to exchange multiplexing type information comprised in the multiplexing information when exchanging a terminal capability set; and a fourth exchanging element, configured to exchange multiplexing type information comprised in the multiplexing information when setting up a call.

9. The device as claimed in claim 6, further comprising:

a transmitting component, configured to perform multiplexing transmission on a media stream according to a result of exchanging the multiplexing information.

10. A telepresence endpoint, comprising the device as claimed in claim 6.

11. The method as claimed in claim 2, after the telepresence endpoints exchanging the multiplexing information, the method further comprising:

performing multiplexing transmission on a media stream according to a result of exchanging the multiplexing information.

12. The method as claimed in claim 3, after the telepresence endpoints exchanging the multiplexing information, the method further comprising:

performing multiplexing transmission on a media stream according to a result of exchanging the multiplexing information.

13. The method as claimed in claim 4, after the telepresence endpoints exchanging the multiplexing information, the method further comprising:

performing multiplexing transmission on a media stream according to a result of exchanging the multiplexing information.

14. The method of as claimed in claim 1, after the telepresence endpoints exchanging the multiplexing information, the method further comprising:

performing multiplexing transmission on a media stream according to a result of exchanging the multiplexing information.

15. The device as claimed in claim 7, further comprising:

a transmitting component, configured to perform multiplexing transmission on a media stream according to a result of exchanging the multiplexing information.

16. The device as claimed in claim 8, further comprising:

a transmitting component, configured to perform multiplexing transmission on a media stream according to a result of exchanging the multiplexing information.

17. The device as claimed in claim 6, further comprising:

a transmitting component, configured to perform multiplexing transmission on a media stream according to a result of exchanging the multiplexing information.

* * * * *